US005710666A

United States Patent [19]
McDonald

[11] Patent Number: 5,710,666
[45] Date of Patent: Jan. 20, 1998

[54] SLIDE VIEWER HAVING A LENTICULAR VIEWING LENS

[75] Inventor: Sean McDonald, Canyon Lake, Calif.

[73] Assignee: Digital Dimension, A California Limited Liability Co.

[21] Appl. No.: 663,936

[22] Filed: Jun. 14, 1996

[51] Int. Cl.[6] .................. G02B 27/22; G09B 29/00
[52] U.S. Cl. .................. 359/463; 359/477; 359/619; 434/365
[58] Field of Search .................. 359/463, 462, 359/477, 619; 434/365; 353/7, 38

[56] References Cited

U.S. PATENT DOCUMENTS

| | | | |
|---|---|---|---|
| 2,974,562 | 3/1961 | Rosenbloom | 359/463 |
| 3,633,301 | 1/1972 | Calabuig | 40/454 |
| 4,117,615 | 10/1978 | Gomolak | 40/363 |
| 4,927,238 | 5/1990 | Green et al. | 350/130 |
| 5,113,213 | 5/1992 | Sandor et al. | 355/22 |
| 5,146,703 | 9/1992 | Boden | 40/454 |
| 5,161,979 | 11/1992 | Sekiguchi | 434/365 |
| 5,276,478 | 1/1994 | Morton | 355/22 |
| 5,278,608 | 1/1994 | Taylor | 355/22 |
| 5,364,274 | 11/1994 | Sekiguchi | 434/365 |
| 5,494,445 | 2/1996 | Sekiguchi et al. | 434/365 |
| 5,588,526 | 12/1996 | Fantone et al. | 359/463 |

Primary Examiner—Jon W. Henry
Attorney, Agent, or Firm—Louis L. Dachs

[57] ABSTRACT

The invention is a viewer for slides having three-dimensional and/or animation type lenticular images recorded thereon in image line sets. In detail, the invention includes a frame. The frame includes a slot for receiving the slide therein having an open end at the top or side of the frame and a closed off opposite end, the slot in a planer relationship with the front and rear walls. The front wall includes a lenticular lens mounted in a planner relation therein, the lens having an internal side forming a portion of the wall of the slot; the lens having a plurality of lenticules therein. The end opposite the open end of the slot is aligned with the lenticules of the lens and positioned within the frame such that a slide positioned in the slot in contact with the opposite end of the slot will have the center of the image line sets in substantial alignment with the center of the lenticules of the lenticular lens. In a second embodiment, the viewer includes only a lenticular lens having a protursion at one end thereof for positioning the slide such that a slide positioned on the protrusion will have the center of the image line sets in substantial alignment with the center of the lenticules of the lenticular lens.

29 Claims, 7 Drawing Sheets

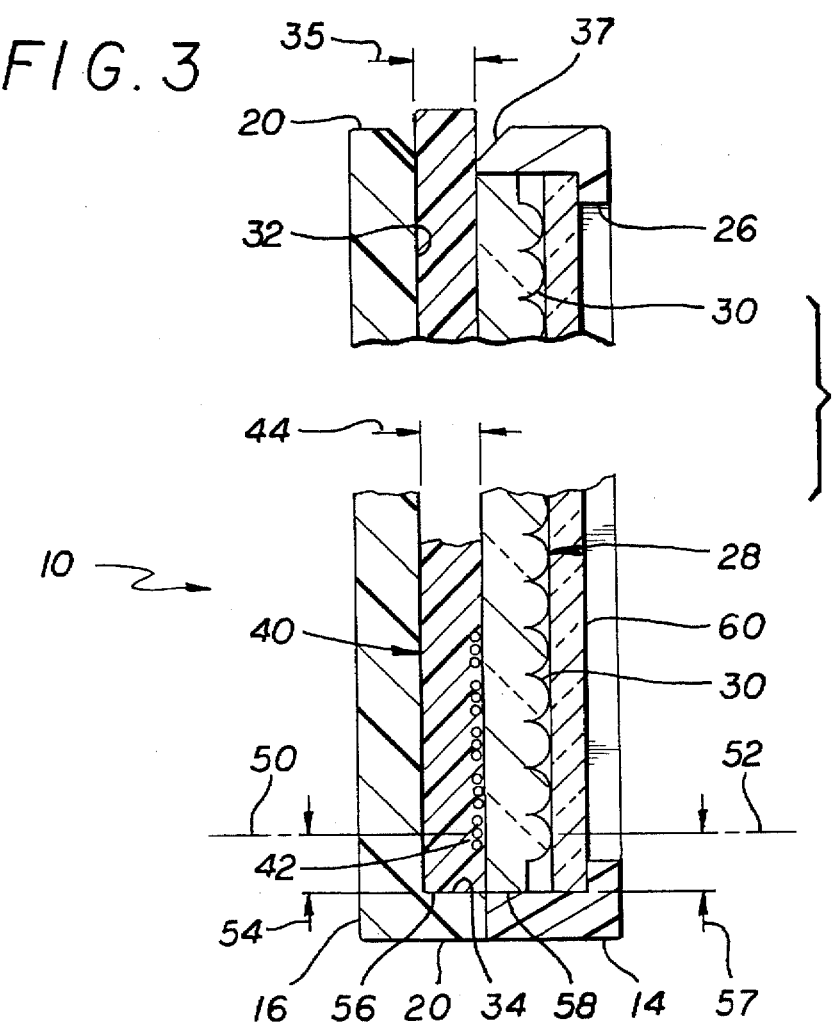
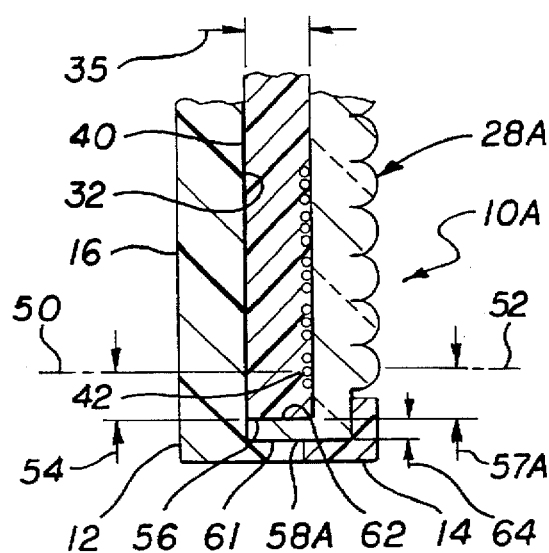
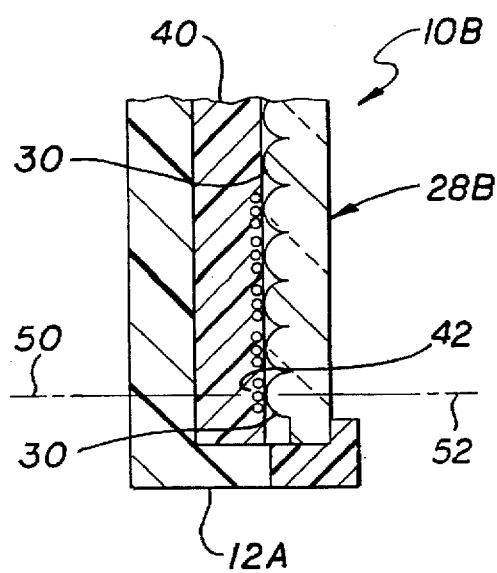

SLIDE VIEWER HAVING A LENTICULAR VIEWING LENS

BACKGROUND OF THE INVENTION

1. Field of the Invention

The invention relates to the field of viewers for slides and, in particular, to a viewer for viewing any type of lenticular image made including, but not limited to, three-dimensional images, and/or animation, multi-image (using two or or two or more similar or dissimilar images, frames of video or film, or morph images).

2. Description of Related Art

In an effort to increase the visual effect of lithographic, photographic, or screen printed images, lenticular lens have been used along with conventional printing techniques to produce 3 dimensional and/or animated images. An animated image is a composite picture made by bringing together into a single composition a number of different images or a sequence of related images, with the different images becoming visible as the viewing angle through the lens changes. However, three-dimensional imaging relies upon the human brain's ability to receive two images of the same object off set from one another and to perceive depth therefrom. One of the most common methods of making both three-dimensional scenes and/or an animated sequence is to use lenticular images formed on a substrate or slide. The lenticular image includes a series of images divided into a series of image lines. Image line sets are then made up by interleaving an image line from each image in a selected order. Thus the sets include one image line from each image. The sets of images are printed on to a substrate and the substrate is then bonded to a lenticular lens or directly onto the lenticular lens with the image line sets aligned wiht individual lenticules (half cylindrical lens).

Again, the net effect is that each image printed on the substrate is selectively visible as a function of the angle from which it is viewed. The method of making such images is discussed in U.S. Pat. No. 5,276,478 "Method And Apparatus For Optimizing Depth Images By Adjusting Print Spacing" by R. A. Morton and U.S. Pat. No. 5,113,213 "Computer Generated Autostereography Method And Apparatus" by E. R. Sandor, et al. In U.S. Pat. No. 5,278,608 "Electronically Printed Depth Photography System With Improved Viewing Range" by R. Y. Taylor, et al, a system and method is disclosed for optimizing the number of scan lines and lenticule pitch. In U.S. Pat. No. 5,364,274 "Process For Producing A Display With Moveable Images" and U.S. Pat. No. 5,161,979 "Process And Display With Moveable Images" both by Y. Sekiguchi, billboard systems are disclosed wherein a series of images are provided in a cartridge that can be installed in a viewer having a lenticular lens. However, there is no teaching of how to maintain alignment of the image sets with the individual lenticules of the lenticular lens.

One of the major problems has been obtaining proper alignment of the printed substrate with the lenticular lens. Typically, the image is made by various printing techniques wherein multiple copies of the image sets are printed on one sheet and each image set is thereafter cut therefrom. A lenticular lens is then bonded over the image sets. Therefore, it is obvious that great care must be taken to insure that the image sets are properly aligned with the lenticules of the lenticular lens. Precise cutting of the substrate and lenticular lens is necessary as well as the maintaining of alignment during bonding or printing on the back of the lenticular lens. This, makes such assemblies considerably more more so than a conventional two dimensional image. However, Sandor, et al discusses the printing of image lines sets on the back of a lenticular lens depending upon good offset printing techniques to insure registration.

Thus it has long been desirable to have viewers that can be used to view such slides, while eliminating the need for each slide to have a lenticular lens bonded thereto. There have been attempts to make billboards in such a manner. For example U.S. Pat. No. 5,146,703 "Lenticular Signs With Discrete Lens Elements" by E. Boden uses a series of vertically arranged lenticular lens which are urged together by springs to define a predetermined pitch regardless of manufacturing processes. However, while the viewer is practical for large billboard signs, it is to complex and expensive for use as a viewer for three-dimensional baseball cards and the like. U.S. Pat. No. 4,927,238 "Method And Apparatus For Displaying A Three Dimensional Visual Image" by J. A. Green, et al. uses pins to maintain the alignment between the lenticular lens and slide. This is also an expensive approach to maintaining alignment between the lenticular lens and slide.

In U.S. Pat. No. 4,117,615 "Viewing Panel For Producing Multiple Images Of A Design" by T. M. Gomolak a portable viewer is disclosed for viewing wall paper behind furniture through a multiplicity of demagnifying fresnel lenses. What the device allows is the use of wall paper samples having full size patterns to be placed behind silhouettes of furniture so that the design of the wall paper (the apparent size of which is reduced) can be viewed in relation to cut outs of furniture placed there in front of the wallpaper to determine the design relationship therebetween. However, while the device is hand held, it has no relationship to viewing animation and/or three-dimensional images.

Thus with the high cost of high quality three dimentional images combined with lenticular viewinges have led to the use of extruded instead of compression molded or injection molded lenticular lenses. These low cost lenses can not support the broad range of images that can be created when higher quality lenses are used. For example, presently, the thickest extruded lenticular lens that can be directly printed on is 0.040 inch thick. Such a lens will not support any more than three "flip" images or a simple animation of similar images or a 3 dimensional image that lacks dimension.

Thus, it is a primary object of the invention to provide a viewer for slides having three dimensional images and/or animation printed thereon.

It is another primary object of the invention to provide a viewer for slides having three dimensional images and/or animation printed thereon that is hand holdable.

It is a further object of the invention to provide a viewer for slides having three dimensional images and/or animation printed thereon that provides precise alignment between the image line sets on the slide and the lenticules of the lenticular lens.

It is a still further object of the invention to provide a viewer for slides having three dimensional images and/or animation printed thereon that can easily be affixed to pages of a book or any other surface.

It is another object of the invention to provide a viewer for slides having three dimensional images and/or animation printed thereon that provides means for adjusting the alignment between the image lines sets on the slide and the lenticules of the lenticular lens.

SUMMARY OF THE INVENTION

In the most general terms the viewer is designed for use with slides having three-dimensional and/or animation type lenticular images recorded thereon in image line sets. The viewer includes a lenticular lens having a plurality of parallel lenticules, and means coupled to the lens having a surface parallel to the lenticules of the lens, with the surface positioned such that a slide mounted on the surface will have the center of the sets of the lines in substantial alignment with the center of the lenticules of the lenticular lens. In its simplest form, the means includes a protrusion extending outward from one edge of the lens that is paraallel to the lenticules of a lenticular screen.

In a preferred embodiment, the viewer includes a frame having front and rear walls. The frame includes a slot for receiving the slide therein having an open end at the top or side of the frame and a closed off opposite end, with the slot in a planer relationship with the front and rear walls. The front wall includes a lenticular lens having a plurality of lenticules therein mounted in a planner relation therein with an internal side forming a portion of the wall of the slot. The end opposite of the opening of the slot is aligned with the lenticules of the lens and positioned within the frame such that a slide positioned in the slot in contact with the end of the slot will have the center of the sets of image lines in substantial alignment with the center of the lenticules of the lenticular lens. Preferably, the lenticular lens includes a lip or protrusion extending outward from the internal side and parallel to the lenticules of the lenticular lens and having a length equal to the width of the slot, the lip extending into the slot forming the end opposite the opening. Also, the lenticular lens can be reversed such that the flat side is the external side and the plurality of curved lenticules are on the internal side. Typically, a gap must be provided between the lenticular lens and the slide to provide proper focusing when the lens is reversed. Viewing is not effected and the flat side of the lenticular lens is easier to clean. Preferably the slide has a specific thickness and the slot has a width just sufficient to allow the slide to enter therein. This insures that the slide will be parallel to the lenticular lens and at the proper distance therefrom. Additionally, the open end of the slot can be chamfered so as to make insertion of the slide into the slot easier to accomplish.

In addition, the slide has a specific length side to side and the viewer further includes the slot having a side to side length just sufficient to allow the slide to enter therein. A cam system can be included that can raise and/or lower the slide's position when the slide is installed in the slot. The cam system includes a shaft rotatably mounted in the bottom of the frame and an end extending out of the front of the frame. A passage is located within the frame extending from the shaft to the end of the slot. A cam is mounted on the shaft having a cam surface movable into the slot when the shaft is rotated. Thus the slide can be moved up and down so that the image line sets can be aligned. In addition, the cam system can be used to cause animation or a 3 dimensional effect with animation. Alternately a cam system can also be included to raise or lower the lens instead of the slide. Optionally, a handle can be connected to the bottom of the frame such that is extends downward from the frame and which can be retracted to a position parallel to the bottom of the frame with a détente system for releasably holding the handle in either position.

In a another embodiment, the frame has and open back extending from the open end of the slot to the opposite end thereof and with a width equal to the slot. A layer of adhesive on the back of the frame extends about the sides and the bottom end of the frame such that when the back side of the frame is contacted with a surface, the surface forms a back wall of the slot. This allows the viewer to be installed in book, or picture album or the like, even a wall of a room. Magnets can be used instead of the adesive allowing the fame to affixed to many metal surfaces. Additionally, the slide can be bonded to the pages or cover of a book or the like such that viewer automatically align with the slide such that image line sets are automatically aligned with the lenticules.

In addition, the lens can be mounted in the frame so that it is movable upward and downward. The lens is biased upward by means of a probe urged upward by a spring. A plunger is movably mounted a the top of the frame of the viewer and is engagable with the lens. The lens should be movable within the slot a distance that is equal to the width of one lenticule thereof. Thus when the slide is installed in the slot in the frame, the plunger can be pushed downward to move the lens for animation or 3 dimensional scenes in order to cycle through the image line sets of the slide.

Of course, the viewer can be designed such that the opening of the slot is at the side of the frame. A probe mounted at the top of the frame is biased downward by a spring. Thus the slide when installed is always moved so that it contacts the bottom end of the slot.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

FIG. 3 is a partial cross-sectional view of the subject viewer shown in FIG. 1 taken along the line 3—3.

FIG. 4 is a cross-sectional view similar to the cross-sectional view shown in FIG. 3 illustrating another embodiment.

FIG. 5 is a cross-sectional view similar to the cross-section view shown in FIG. 3 illustrating further embodiment.

FIG. 8 is a view similar to FIG. 2 illustrating another embodiment wherein the viewer is bonded to the pages of the book or the like.

DESCRIPTION OF THE PREFERRED EMBODIMENT

Figure 1:
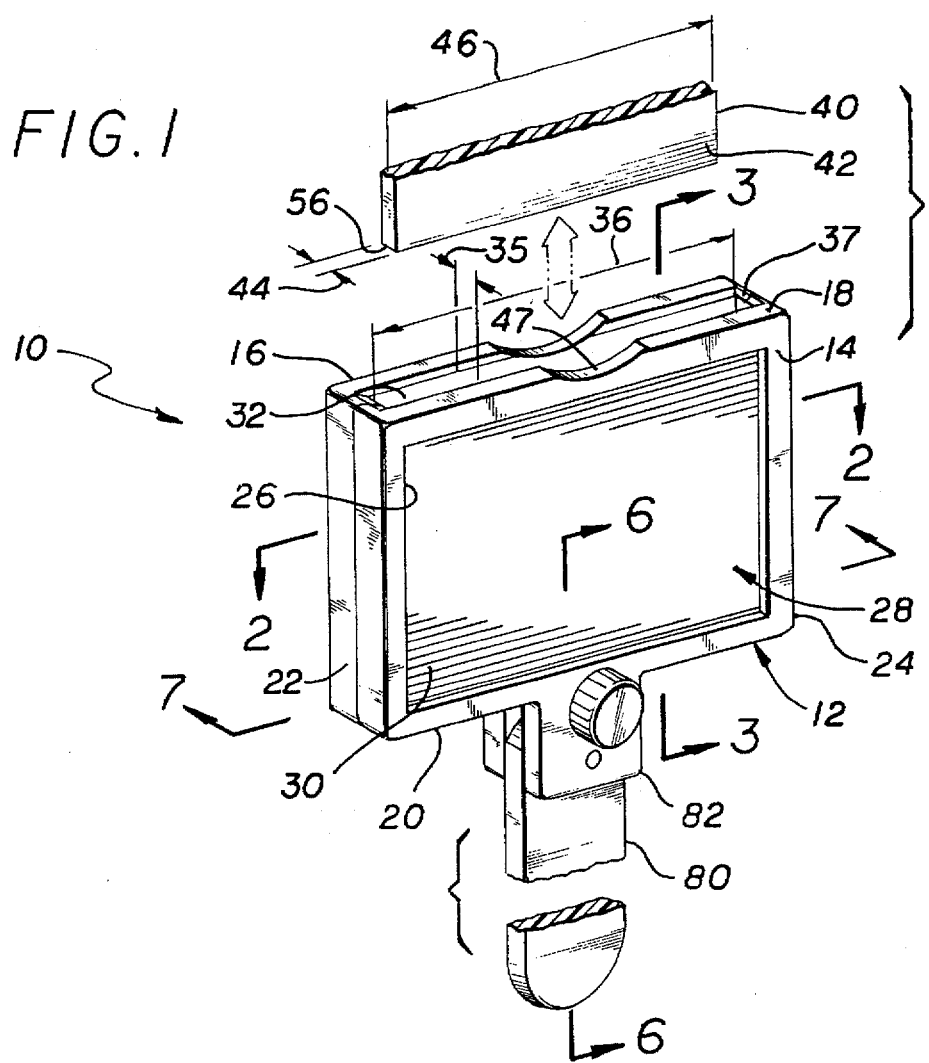
FIG. 1 is a perspective view of the subject viewer.
Figure 2:
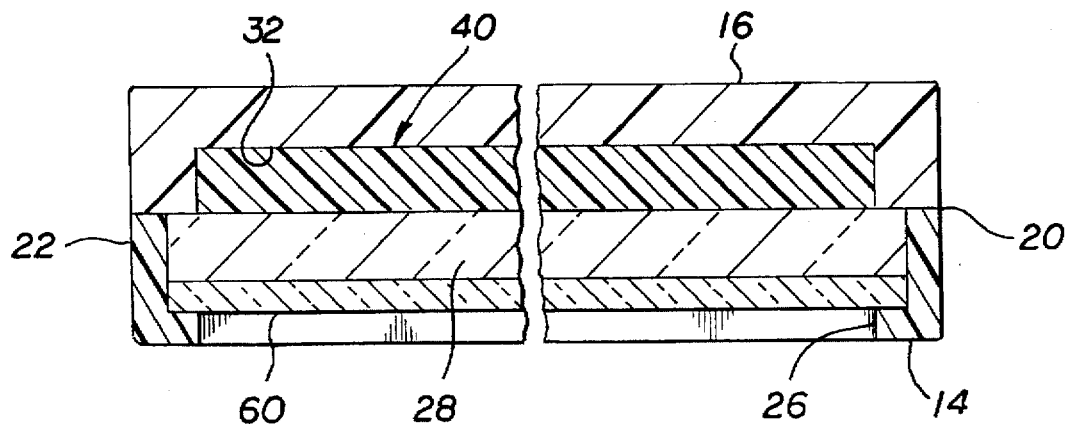
FIG. 2 is a partial cross-sectional view of the subject viewer shown in FIG. 1 taken along the line 2—2.

Referring to FIGS 1 through 3, the viewer, generally indicated by numeral 10, includes a front member 14 and a back member 16 bonded together, a top 18 and bottom 20, and sides 22 and 24. The front member 14 includes an opening 26 incorporating a lenticular lens 28. Of course, other methods of joining the two members 14 and 16 together. The Lenticular lens 28 is made up of a plurality of lenticules 30. A slot 32 extends from the top 18 partially through the joined frames 14 and 16, and having a bottom end 34. The slot 32 has a width and length indicated by numerals 35 and 36, respectively. The top end of the slot 32 is chamfered, indicated by numeral 37 and the top 18 of the frame 12 incorporates a notch 47. Also illustrated is a slide 40 having a plurality of image line sets 42 thereon. The slide 40 also has a thickness 44 and width 46 that are only very slightly less than the thickness 35 and width 36 of the slot 32, such that the slide fits in the slot with a very close fit. The chamfered end 37 of the slot 32 allows the slide 40 to be easily installed therein, while the notch 47 allows the slide, once installed, to be easily removed from the slot.

The critical feature of the viewer 10 is that the slot 32 and slide 40 and lenticular lens 28 are so designed that the center line 50 of the image sets 42 are precisely aligned with the centerline 52 of the lenticules 30. That is the distance 54 from the bottom end 56 of slide 40 exactly equals the distance 57 from the bottom end 58 of the lenticular lens 28 to the centerline 52 of the individual lenticules 30. While it is impossible to make them exactly equal, the slide and viewer must be carefully manufactured by conventional techniques to be substantially equal. However, the individual lens and slides are manufactured, as well as the overall frame 12 design, the critical factor remains the alignment of the centerlines 50 and 52 of image sets 42 of the slide 40 and lenticules 30 of lens 28, respectively. As illustrated in FIG. 3 a clear protective cover 60 can be installed over the lenticular lens 28 to provide protection therefore; however the cover is optional.

While the front frame member 14 and lens 28 are shown as separate structures, it is possible that lens could be part of a larger lenticular display. as a billboard (not shown). The rear frame 16, which would include, the slot 32, could be joined to a portion of the lens of the larger lenticular display.

In a second embodiment illustrated in FIG. 4 the viewer, indicated by numeral 10A includes a lenticular lens 28A having a protrusion or lip 61 at its bottom end 58A that extends across the width 35 of the slot 30. Thus the bottom end 56 of the slide 40 contacts the surface 62 of the protrusion 61. Here the distance 54 from the end 56 of the slide 40 to the centerline 50 of the image set 42 still remains aligned with the centerline 52 of lenticules 30 by proper section of the thickness 64 of the protrusion 61. The advantage of this embodiment is that the lens 28A can be molded in a one step operation, insuring a precise distance 57A from the surface 62 to the centerline 52 of the lenticules 30. It should be noted that, in order to reduce cost, most lens are extruded and thereafter cut to size and bonded to the slide. By use of a viewer the cost is reduced because a lens does not have to bonded to each slide. Illustrated in FIG. 5 is a third embodiment wherein the viewer 10B having a frame 12A that includes a lens 28B with the lenticules 30 reversed, i.e. facing the slide 40. However, the centerlines 50 of the image sets 42 remain aligned with the centerline 52 of the lenticules 30.

It is sometimes desirable to provide means to adjust the position of the image sets 42 to the lenticules 30. Furthermore, as can be seen in FIG. 1 and additionally in FIGS. 6 and 7, this is accomplished by providing a slot 70 at the bottom of the frame 12 with a shaft 72 rotatably mounted at its ends 74 and 76 in the front and rear members 14 and 16 thereof. The end 74 terminates in an externally mounted knob 78. A cam 80 is mounted on the shaft 72 that can be extended into the slot 32 upon rotation of the knob 78 causing the slide 40 to move up or down the length of on lenticule 30. The tight fit of the slide 40 in the slot 32 insures that the image sets 42 remain horizontally aligned with the lenticules 30 of the lens 28. If such a cam system is used in the version of illustrated in FIG. 4 where in the lens 28A includes a protrusion 61, a slot (not shown) must be provided in the protrusion so that the cam an enter the slot 32. This of course provides a means to achieve animation without moving the viewer.

Figure 6:
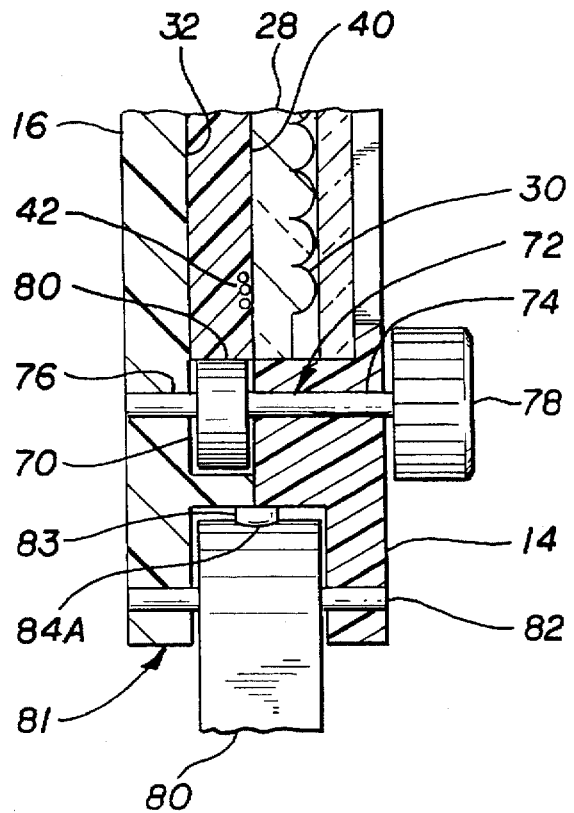
FIG. 6 is partial cross-section view of the subject viewer shown in FIG. 1 taken along the line 6—6.
Figure 7:
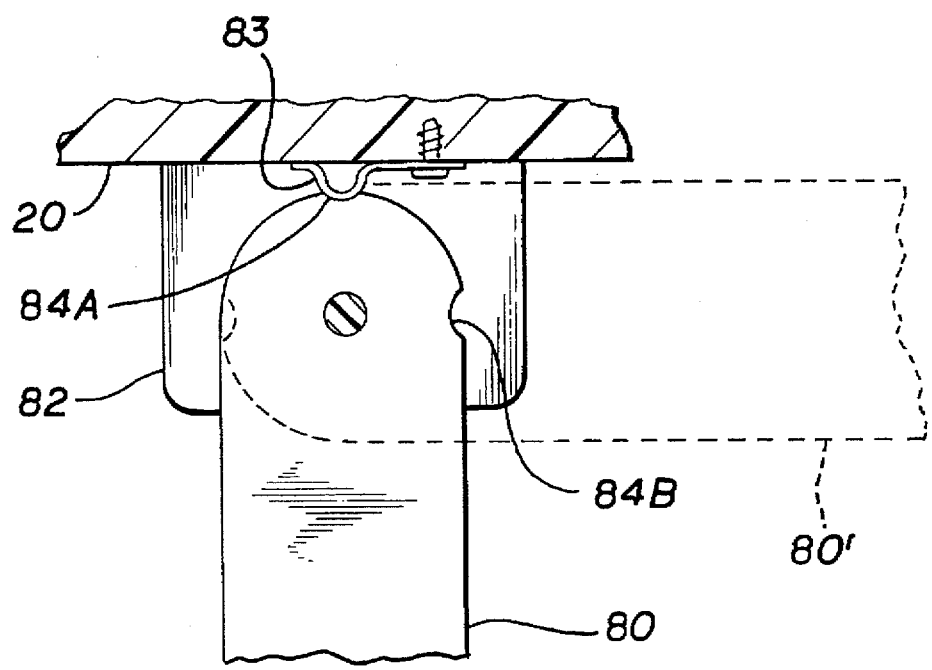
FIG. 7 is partial cross-sectional view of the subject viewer shown in FIG. 1 taken along the line 7—7.

Still referring to FIGS. 1, 6 and 7, it is also sometimes desirable to provide a handle for holding the viewer, preferably, a foldable handle 80. The handle 80 is pivotably mounted to a clevis 82 at the bottom 20 of the frame 12. It is rotatable from a retracted position (shown in dotted lines and indicated by numeral 80') to the extended position. A spring clip 83 mounted within the clevis 82 is engagable with holes 84A and 84B in the end of the handle 80 for releasably holding the handle in either position.

Figure 8:
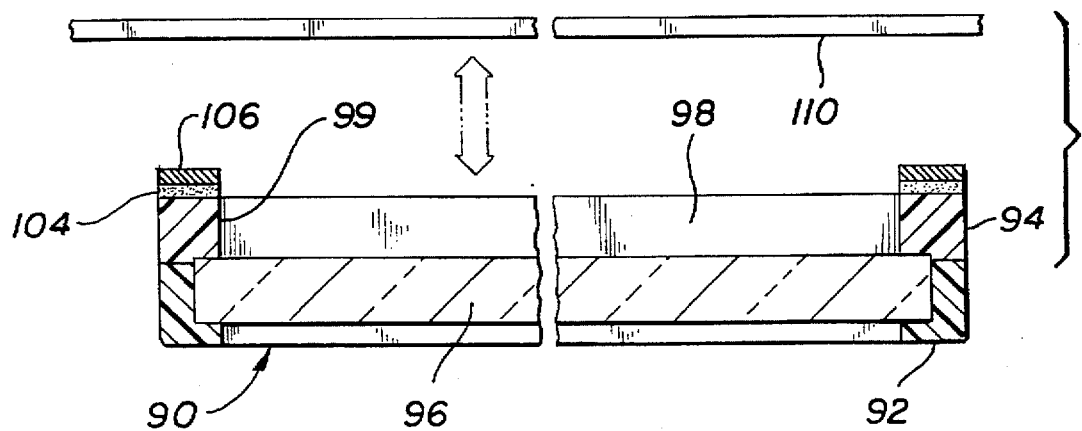

It may also be some times desirable to mount such a viewer in a book or the like. This can be accomplished by use of the viewer 90 illustrated in FIG. 8 (a fourth embodiment). Here the viewer 90 has a front member 92 and back member 94 with a lens 96. However, the back member 94 is cut away, indicated by numeral 98 so that it forms an open slot 99 for the slide. The back member 94 is covered with a layer 104 of adhesive 104 over which is applied a strippable "non-stick" sheet 106. To mount the viewer 90, such as to the inside of the cover of a book, indicated by numeral 110, one need only strip the sheet 106 off the adhesive 104 and press the viewer thereon. The cover 110 becomes the back wall of the slot. Note that the layer of adhesive is generally so thin that it has little effect on the thickness of the slot 99. Note also that in such applications, the handle 80 shown in FIG. 7 is unnecessary. Additionally, the layer 104 could be a magnet so that the viewer 90 could be attached to various magnetically attractable metals. In this version, the strippable sheet 106 would be unnecessary.

Figure 9:
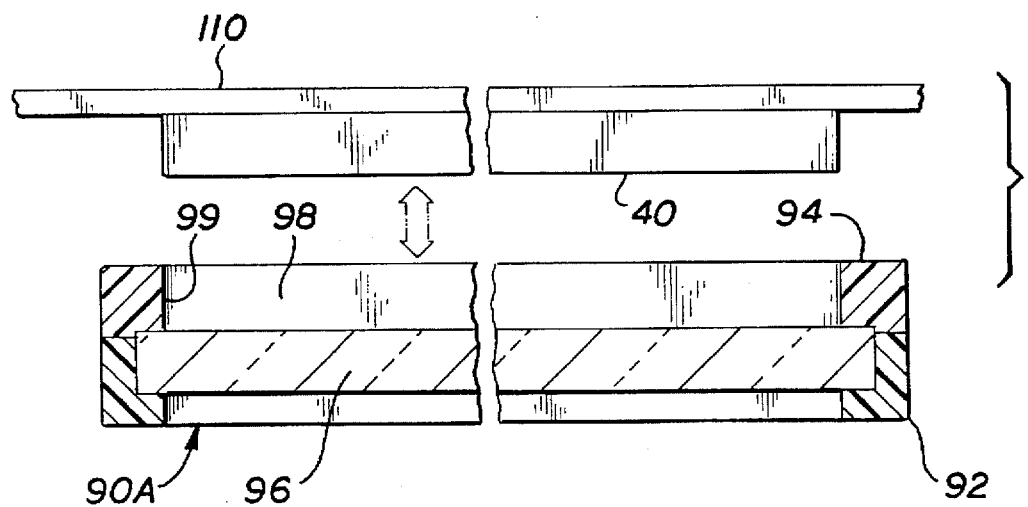
FIG. 9 is a view similar to FIG. 2 illustrating further embodiment wherein the slide is bonded to pages of a book or the like and viewer is adapted to fit over the slide.

It may also become desirable to have a viewer for slides that are mounted on the cover or pages of a book. As illustrated in FIG. 9, the fifth embodiment of the viewer indicated by 90A is similar to the viewer 90 shown in FIG. 8 except that there is no adhesive layer. The slide 40 is bonded to the cover 110 and the viewer 90A is just positioned there over, with alignment automatically occurring. However, the installation of the viewer 90A should not be limited to just books; for example, if the slide is large it could be mounted on a wall of a room.

Figure 10:
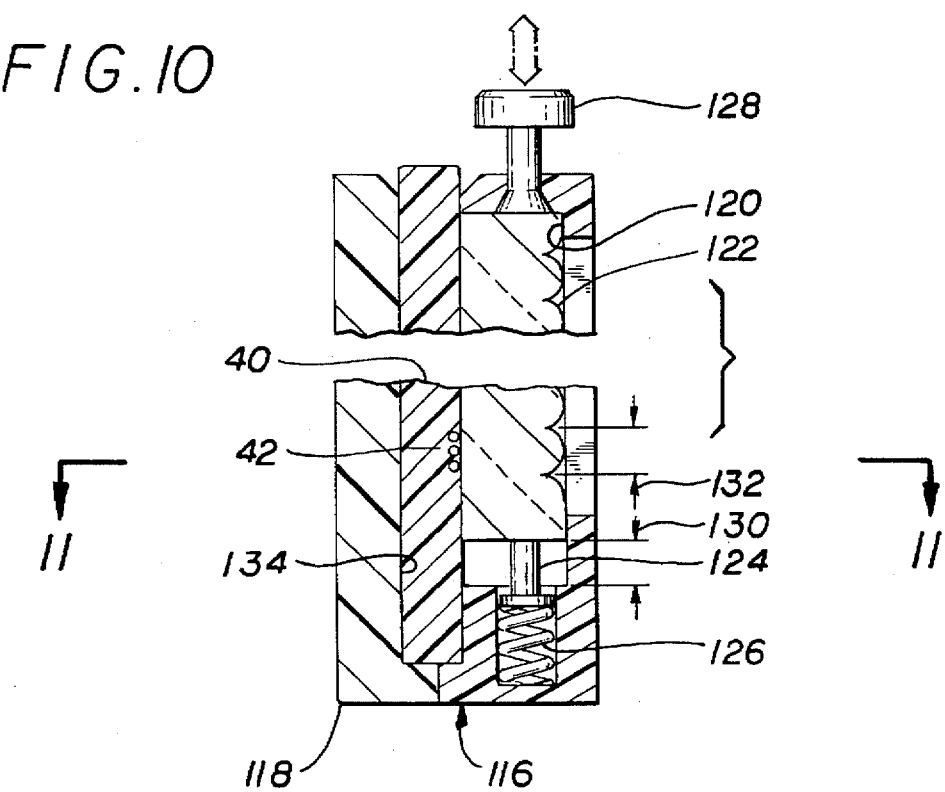
FIG. 10 is a view similar to FIG. 3 illustrating a still further embodiment wherein the lens is movably mounted in the frame of the viewer by means of a cam system.
Figure 11:
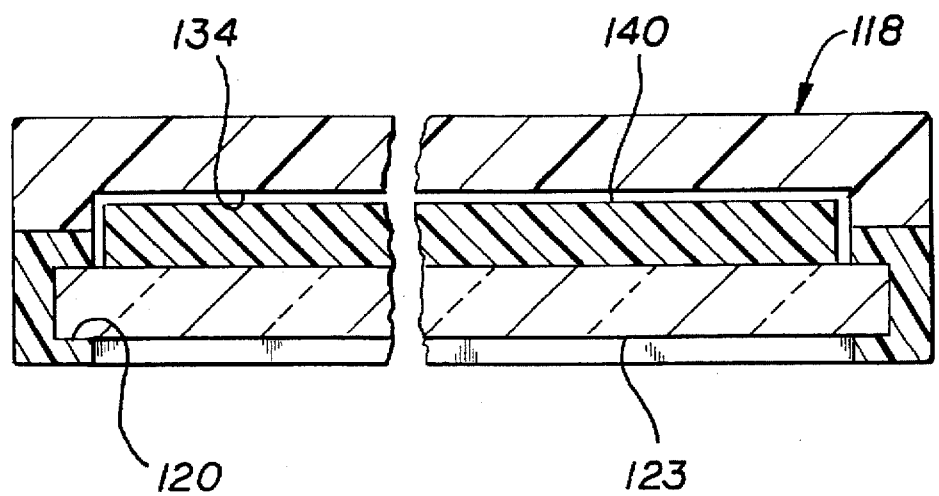
FIG. 11 is a cross-sectional view of FIG. 10 taken along the line 11—11.

While the viewer shown in FIG. 6 provides for adjustment of the slide 40, it is also possible to adjust the position of the lens to obtain alignment of the image line sets. In a sixth embodiment illustrated in FIGS. 10 and 11, the viewer, generally indicated by numeral 116, includes a frame 118 having a slot 120 in which a lens 122 is movably mounted therein. The lens 122 is biased upward by means of a probe 124 urged upward by a spring 126. A plunger 128 is movably mounted in the frame 118 and is engagable with the lens 122. The lens 122 is movable within the slot 120 a distance 130 that is equal to the width 132 of one lenticule 122 or more. Thus when the slide 40 is installed in the slot 134 of the frame 118, the plunger 128 can be pushed downward to move the lens 122 so as to cycle through the image line sets 42 of the slide 40. Of course, the handle 80 shown in FIG. 1 could be included in this embodiment.

Figure 12:
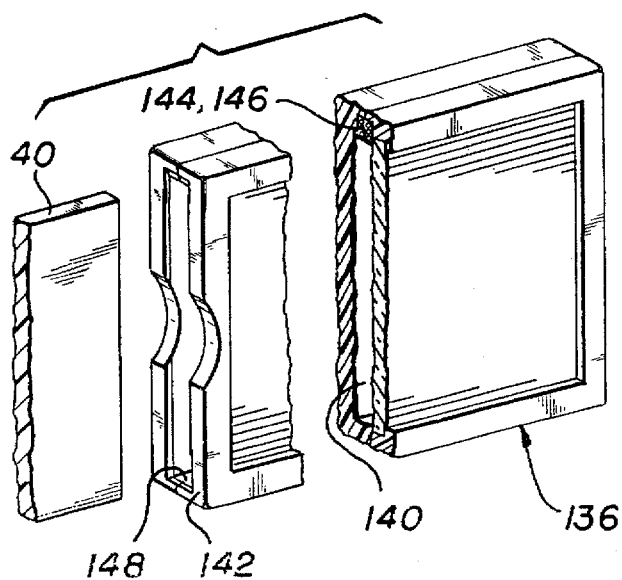
FIG. 12 is a perspective view of a viewer wherein the slide is installed from the side.

In a seventh embodiment illustrated in FIG. 12, the viewer, generally indicated by 136, is similar to the other viewers except that the slot 140 has its opening on the side 142. Here a probe 144 is biased downward, by a spring 146. Thus a slide when installed is always moved so that it contacts the bottom end 148 of the slot 140. The handle feature illustrated in FIG. 1 as well as the lens having a protrusion serving as the bottom end of the slot as illustrated in FIG. 4 can be incorporated. Alternately to the movable slide, the movable lens feature of FIGS. 10 and 11 can be used.

Figure 13:
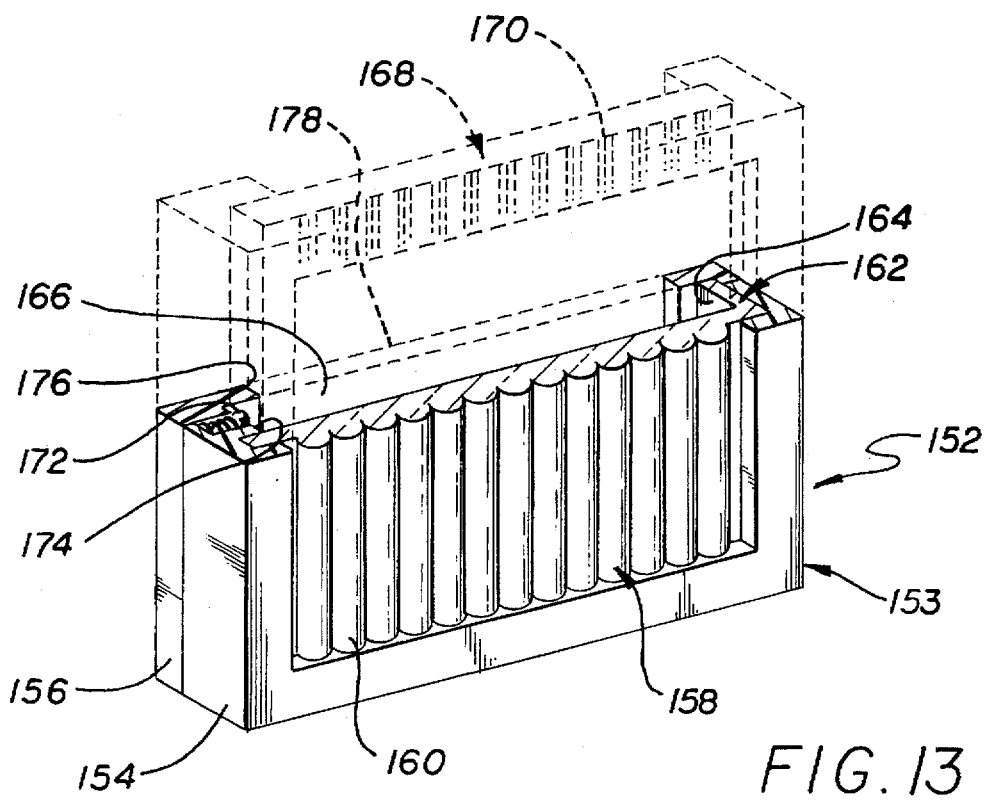
FIG. 13 is a perspective view of viewer wherein the lenticules of the lenticular lens are parallel to the slot opening the aligning protrusion is at one side.

An eighth embodiment is illustrated in FIG. 13 wherein the viewer, generally indicated by numeral 152, includes a frame 153 having front and rear portions 154 and 156. However, the lenticular lens 158 has the individual lenticules 160 running vertically. In addition, the protrusion 162 having a surface 164 is also vertically positioned at one end of the slide slot 166. A slide 168, shown in dotted lines having vertical image line sets 170 is inserted into the slot 166 from the top and is urged toward the surface 164 by a spring biased ball assembly 172 mounted in side 174 of slot 166 opposite the surface 164. In this embodiment the back wall of the frame 153 is cut away providing an opening 176 into the slot 166 where light can enter. This allows the use of transparent slides which require back lighting. Of course, a transparent plate 178, shown in dotted lines, could be inserted molded into the opening 176. Both of these versions, allowing the use of transparent slides, could be used with other embodiments such as the one illustrated in FIG. 1.

Figure 14:
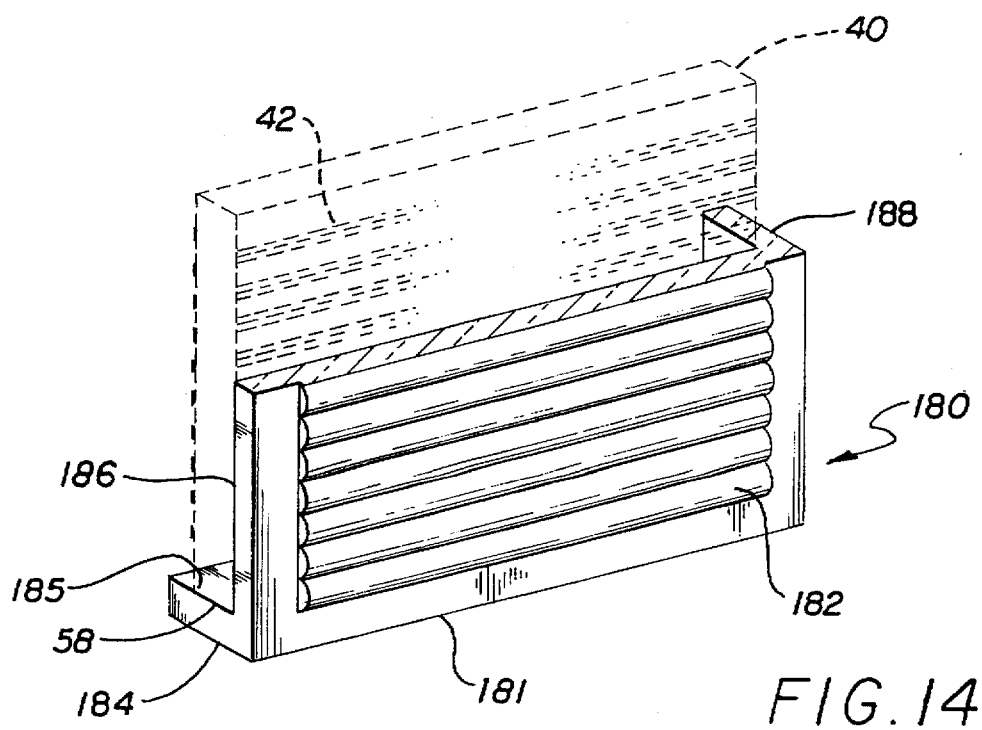
FIG. 14 is a perspective view of a viewer consisting solely of a lenticular lens.

A ninth embodiment is illustrated in FIG. 14 wherein the viewer, generally indicated numeral 180, consists only of a lenticular lens 181 having lenticules 182. The lens includes a protrusion 184 having a surface 185 upon which a slide 40 is mountable. Of course, the relationship of distances between the center line of the image line sets 42 and the end 58 of the slide 40 to the distance from surface 185 of the protrusion 184 is similar to that illustrated in FIG. 4. An optional shoulder 188 is provided on one end of lens for positioning purposes. This is, of course, is the most simple viewer illustrated, but still maintains the critical alignment between the centerlines of the image line sets and centerlines of the lenticules.

Figure 15:
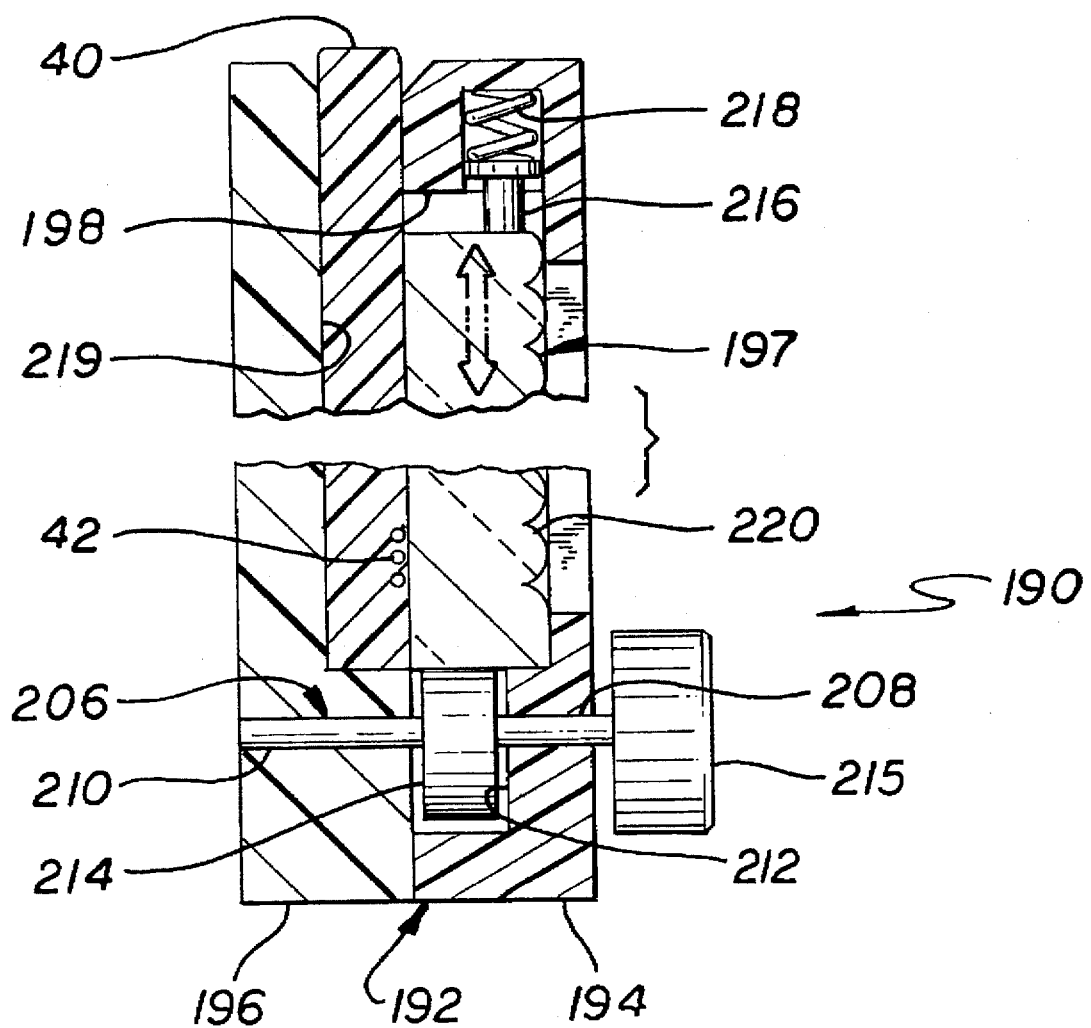
FIG. 15 is a cross-sectional view similar to FIG. 3 wherein the lenticular lens is movable by a cam system.

Illustrated in FIG. 15 is a tenth embodiment of the viewer. The viewer, generally indicated by numeral 190, includes a frame 192 having front and rear members 194 and 196 joined together by convention means. A lenticular lens 197 is movably mounted a slot in the front member 194. A shaft 206 is rotatably mounted by its first end 208 in the front member 194 and by its second end 210 in the member 196 and extends through a slot or passage 212 that is in communication with the slot 198. A cam 214 is mounted within the slot 212 and is in contact with the bottom of the lens 198. A knob 215 is attached to the shaft 206 at its second end 208, thus rotation of the knob will cause the cam 214 to contact the bottom of the lens 198 pushing it upward. A probe 216 mounted in the top of member 194 and is urged into contact with the top of the lens 197 by means of a spring 218. Thus probe 216 tends to push the lens 197 downward so that contacts the bottom of the slot 198 as the cam is rotated out of contact with the bottom of the lens. Of course, the slide 40 mounted in a slot 219 will have the center of its image line sets 42, as in the previous examples, automatically aligned with the centerlines of the lenticules 220 of the lens 197, when the slide is at the bottom of the slot 218 and the lens is at the bottom of slot 198. Of course, the handle 80 illustrated in FIG. 1 and the cutout rear frame for use with transparent slides as illustrated in FIG. 13 can be incorporated into this embodiment.

While numerous embodiments have been disclosed features of each can be combined. For example, the lens position adjustment systems disclosed in FIGS. 10 and 15 could be used with the viewers disclosed in FIGS. 8 and 9. The handle disclosed in FIGS 1 and 7 could be used with all the embodiments. However, as previously stated, the viewer size is not limited to hand holdable sizes; they could well be made as large as billboard. In addition, while hand controllable knobs are illustrated in the viewers shown in FIGS. 6 and 15, these could just as well be driven by electric motors and the like. This also applies to the movable lens mechanism shown in FIG. 10. In addition, the lenticular lens mounted in frames can be made replaceable, if the frame members are separable. Thus, if the lens is replaceable, different types of lens can be used. Thus the lack of one feature from an embodiment should not emply that the feature can not be combined with other features.

Regardless of the cominations of embodiments and features, the reduction in cost of using slides with a single viewer allows the use of high quality lenses such that a lenticular image having 250 frames or more can be used that provides inconspicuous angular transitions between views for 3D and/or animation. Another advantage of the viewer is that all the methods of making the slides, which include conventional photographic cameras, electronic cameras, multi-lens cameras, computer generated images, lenticular scanning cameras and printed media, are sources for the acquisition and/or creation of 3d and/or animated images to be printed on a slide as a photographic image, lithographic image, or screen printed image.

While the invention has been described with reference to particular embodiments, it should be understood that the embodiments are merely illustrative as there are numerous variations and modifications which may be made by those skilled in the art. Additionally, in the various embodiments described in the specification can be combined, where not mutually exclusive, as desired unless mutually exclusive. Thus, the invention is to be construed as being limited only by the spirit and scope of the appended claims.

INDUSTRIAL APPLICABILITY

The invention has applicability to the lithographic, photographic and screen printing industries.

I claim:

1. A viewer for slides having three-dimensional and/or animation type lenticular images recorded thereon in image line sets, the viewer comprising a frame having front and rear walls; said frame having a slot for receiving the slide therein having an open end and a closed off bottom end, said slot in a planar relationship with said front and rear walls; said front wall having a lenticular lens, having a plurality of lenticules therein, mounted in a planar relation therein, said lens having an internal side forming at least a portion of the wall of the slot; said bottom end of said slot aligned with said lenticules of said lens and positioned within said frame such that a slide positioned in said slot in contact with said end of said slot will have the center of the sets of the lines in substantial alignment with the center of said lenticules of said lenticular lens.

2. The system as set forth in claim 1 wherein said opening of said slot is at said top of said frame.

3. The viewer as set forth in claim 1 comprising said opening of said slot is at the side of said frame.

4. The viewer as set forth in claim 1, or 2, or 3, wherein said lenticular lens having a protrusion at its bottom end extending outward from said internal side and having a length equal to said width of said slot, said protrusion extending into said slot forming the bottom end thereof.

5. The viewer as set forth in claim 4 wherein the slide has a specific thickness and said slot having a width just sufficient to allow the slide to enter therein.

6. The viewer as set forth in claim 5 comprising
said slot having a side to side length just sufficient to allow the slide to enter therein; and
means to raise and or lower said slide's position when the slide is installed in said slot.

7. The viewer as set forth in claim 6 wherein said means to raise and or lower said slide's position when the slide is installed in said slot includes
a shaft rotatably mounted in the bottom of said frame and an end extending out of said frame;
a passage within said frame extending from said shaft to said end of said slot; and
a cam mounted on said shaft having a cam surface movable into said slot when said shaft is rotated.

8. The viewer as set forth in claim 1, or 2, comprising said lenticular lens includes a flat external side and a plurality of curved lenticules on said internal side.

9. The viewer as set forth in claim 5 comprising a handle connected to the bottom of said frame, said handle extending downward therefrom.

10. The viewer as set forth in claim 9 comprising said handle retractable to a position parallel to the said bottom of said frame.

11. The viewer as set forth in claim 10 comprising détente means for releasably holding said handle in said extended and retracted positions.

12. The viewer as set forth in claim 5 wherein said front wall is transparent and extends over said lenticular lens.

13. The viewer as set forth in claim 1, or 2 wherein said slot extends through said back wall.

14. The viewer as set forth in claim 13 comprising means mounted on the said back wall; such that said frame can be bonded to a surface wherein the surface forms a rear wall of said slot; said means selected from the group consisting of a layer of magnetic material or adhesive material.

15. The viewer as set forth in claim 14 where a strippable protective layer is removably affixed to said layer of adhesive material.

16. The viewer as set forth in claim 15 wherein the slide has a specific thickness and said slot having a width just sufficient to allow the slide to enter therein.

17. The viewer as set forth in claim 16 wherein the slide has a specific length side to side, said viewer further comprising:
said slot having a side to side length just sufficient to allow the slide to enter therein; and
means to raise and or lower said slide's position when the slide is installed in said slot.

18. A viewer for slides having three-dimensional and/or animation type lenticular images recorded thereon in image line sets, the viewer comprising a frame having front and rear walls; said frame having a slot for receiving the slide therein having an open end and a closed off bottom end, said slot in a planar relationship with said front and rear walls; said front wall having a lenticular lens with a plurality of lenticules movably mounted in a planar relation therein, said lens having an internal side forming a portion of the wall of the slot; said bottom end of said slot aligned with said lenticules of said lens and positioned within said frame such that a slide positioned in said slot in contact with said end of said slot will have the center of the sets of the lines in substantial alignment with the center of said lenticules of said lenticular lens;
means to bias said lens toward said top of said frame; and
means to manually urge the lens toward said bottom end of said slot.

19. The viewer as set forth in claim 18 comprising said lens movable at least the width of one of said lenticules of said lens.

20. The viewer as set forth in claim 19 therein said opening of said slot is at said top of said frame.

21. The viewer as set forth in claim 19 comprising said opening of said slot is at the side of said frame.

22. The viewer as set forth in claim 21 wherein the slide has a specific thickness and said slot having a width just sufficient to allow the slide to enter therein.

23. The viewer as set forth in claim 22 wherein the slide has a specific length side to side, said viewer further comprising:
said slot having a side to side length just sufficient to allow the slide to enter therein; and
means to raise and or lower said slide's position when the slide is installed in said slot.

24. The viewer as set forth in claim 23 comprising a handle connected to the bottom of said frame, said handle extending downward therefrom.

25. The viewer as set forth in claim 24 comprising said handle retractable to a position parallel to the said bottom of said frame.

26. The viewer as set forth in claim 25 comprising détente means for releasably holding said handle in said extended and retracted positions.

27. A viewer for slides having three-dimensional and/or animation type lenticular images recorded thereon in image line sets, the viewer comprising
a lenticular lens having a plurality of parallel lenticules, and
means coupled to said lens having a surface parallel to the lenticules of said lens, said surface positioned on said lens such that a slide mounted on said surface will have the center of the sets of the lines in substantial alignment with the center of said lenticules of said lenticular lens, wherein said means comprises a protrusion extending outward from one edge of said lens, said protrusion having a length equal to the width of the slide.

28. A viewer for slides having three-dimensional and/or animation type lenticular images recorded thereon in image line sets, the viewer comprising a frame having front and rear walls; said frame having a slot for receiving the slide therein having an open end and a closed off bottom end, said slot in a planar relationship with said front and rear walls; said front wall having a lenticular lens with a plurality of lenticules movably mounted in a second slot in communication with said first slot and in a planner relation therein, said lens having an internal side forming a portion of the wall of the slot; said bottom end of said slot aligned with said lenticules of said lens and positioned within said frame such that a slide positioned in said slot in contact with said end of said slot will have the center of the sets of the lines in substantial alignment with the center of said lenticules of said lenticular lens;

means to bias said lens toward the bottom of said frame; and means to manually move the lens toward the top end of said frame.

29. The viewer as set forth in claim 28 wherein said means to move said lens toward the top of said frame includes a shaft rotatably mounted in the bottom of said frame having an end extending out of said frame;

a passage within said frame extending from said shaft to second slot; and a cam mounted on said shaft within said passage and having a cam surface movable into said second slot and into contact with the bottom of said lens when said shaft is rotated moving said lens upward.

* * * * *